United States Patent
Miyabe et al.

(10) Patent No.: US 12,337,286 B2
(45) Date of Patent: Jun. 24, 2025

(54) COMPOSITE SEMIPERMEABLE MEMBRANE

(71) Applicant: Nitto Denko Corporation, Ibaraki (JP)

(72) Inventors: Tomotsugu Miyabe, Ibaraki (JP); Masamitsu Taguchi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 541 days.

(21) Appl. No.: 17/783,677

(22) PCT Filed: Dec. 4, 2020

(86) PCT No.: PCT/JP2020/045243
§ 371 (c)(1),
(2) Date: Jun. 9, 2022

(87) PCT Pub. No.: WO2021/117631
PCT Pub. Date: Jun. 17, 2021

(65) Prior Publication Data
US 2023/0058893 A1    Feb. 23, 2023

(30) Foreign Application Priority Data

Dec. 11, 2019  (JP) ................. 2019-223925
Oct. 13, 2020  (JP) ................. 2020-172683

(51) Int. Cl.
*B01D 69/02* (2006.01)
*B01D 69/10* (2006.01)
*B01D 69/12* (2006.01)
*B01D 71/40* (2006.01)

(52) U.S. Cl.
CPC .......... *B01D 71/401* (2022.08); *B01D 69/02* (2013.01); *B01D 69/106* (2022.08); *B01D 69/12* (2013.01); *B01D 2325/12* (2013.01)

(58) Field of Classification Search
CPC .... B01D 71/401; B01D 69/02; B01D 69/106; B01D 69/12; B01D 2325/12;
(Continued)

(56) References Cited

U.S. PATENT DOCUMENTS

2013/0306550 A1* 11/2013 Jeong ................... B01D 71/82
                                                                        427/244
2019/0329184 A1    10/2019 Antony Prince et al.

FOREIGN PATENT DOCUMENTS

CN    103402616 A    11/2013
CN    107297158 A    10/2017
(Continued)

OTHER PUBLICATIONS

Office Action issued on Apr. 9, 2024 for corresponding Indian Patent Application No. 202217032365 (3 pages).
(Continued)

*Primary Examiner* — Pranav N Patel
(74) *Attorney, Agent, or Firm* — HAUPTMAN HAM, LLP

(57) ABSTRACT

A composite semipermeable membrane includes a porous support membrane, a separation functional layer containing a polyamide disposed on the porous support membrane, and a coating layer disposed on the separation functional layer, wherein a water contact angle of a surface of the coating layer is 40° or less, and a protein adsorption force of the surface of the coating layer is 0.4 nN or less.

4 Claims, 1 Drawing Sheet

(58) Field of Classification Search
CPC .......... B01D 61/025; B01D 71/76; B01D 2321/281; B01D 2323/02; B01D 2325/18; B01D 2325/36; B01D 67/0088; B01D 69/1251; B01D 71/56; B01D 71/82; B01D 69/107; B01D 69/1216; B01D 65/08; C09D 133/14; B32B 2255/10; B32B 2255/26; B32B 2255/28; B32B 2262/0276; B32B 27/286; B32B 5/022; B32B 27/12; B32B 5/18; B32B 27/34; Y02A 20/131; C08F 220/36
See application file for complete search history.

(56) References Cited

FOREIGN PATENT DOCUMENTS

| | | |
|---|---|---|
| CN | 108203510 A | 6/2018 |
| CN | 109999662 A | 7/2019 |
| GB | 2 390 042 A | 12/2003 |
| JP | 2007-56220 A | 3/2007 |
| JP | 2014-510621 A | 5/2014 |
| JP | 2019-147879 A | 9/2019 |
| TW | I525108 B | 3/2016 |
| WO | 2011/088505 A1 | 7/2011 |
| WO | 2011/162225 A1 | 12/2011 |
| WO | 2018/124103 A1 | 7/2018 |

OTHER PUBLICATIONS

Decision of Rejection issued on Apr. 27, 2024 for corresponding Chinese Patent Application No. 202080085032.X, along with an English translation (18 pages).
European Office Action issued Dec. 21, 2023, corresponding to European Application No. 20900480.3 (6 pages).
Office Action issued on Aug. 20, 2023 for corresponding Chinese Patent Application No. 202080085032.X, along with an English translation (18 pages).
Office Action issued on Nov. 8, 2024 for corresponding Korean Patent Application No. 10-2022-7019244, along with an English translation (8 pages).
The Second Office Action issued on Feb. 3, 2024 for corresponding Chinese Patent Application No. 202080085032.X along with an English translation (18 pages).
Zhang Yuzhong et al., "Liquid Separation Membrane Technology and Application", Chemical Industry Press, Oct. 2003, p. 91, along with an English translation (5 pages) cited in NPL No. 1.
Office Action issued on Oct. 19, 2022, for corresponding India Patent Application No. 202217032365 (6 pages).
Office Action issued on Jul. 30, 2024 for corresponding Japanese Patent Application No. 2020-172683, along with an English machine translation (5 pages).
The Extended European Search Report issued on Dec. 23, 2022 for corresponding European Patent Application No. 20900480.3 (7 pages).
Ginic-Markovic et al., "Biofouling resistance of polysulfobetaine coated reverse osmosis membranes", Desalination, Elsevier, vol. 369, May 4, 2015, pp. 37-45 (9 pages), cited in NPL No. 1.
Office Action issued on Oct. 1, 2024 for corresponding Taiwanese Patent Application No. 109143622, along with an English translation (14 pages).
International Search Report issued on Jan. 12, 2021, for corresponding International Patent Application No. PCT/JP2020/045243, 5 pages, along with an English translation.
Written Opinion issued on Jaunary 12, 2021, for corresponding International Patent Application No. PCT/JP2020/045243, 4 pages.

\* cited by examiner

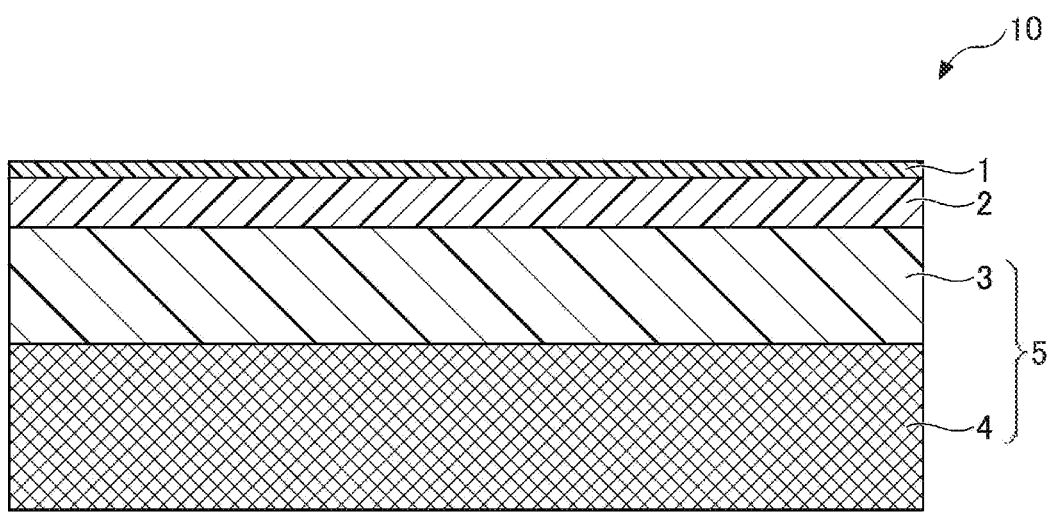

COMPOSITE SEMIPERMEABLE MEMBRANE

CROSS-REFERENCE TO RELATED APPLICATION

This application is a National Stage of International Application No. PCT/JP2020/045243, filed on Dec. 4, 2020, which designates the United States and was published in Japan, and which is based upon and claims priority to Japanese Patent Application No. 2019-223925 filed on Dec. 11, 2019 and Japanese Patent Application No. 2020-172683 filed on Oct. 13, 2020, in the Japan Patent Office. All of the aforementioned applications are hereby incorporated by reference in their entireties.

TECHNICAL FIELD

The present invention relates to a composite semipermeable membrane.

BACKGROUND ART

Composite semipermeable membranes with porous support membranes and separation functional layers thereon are known as separation membranes for desalting, which are used as reverse osmosis membranes. Furthermore, the separation functional layer which is treated with a hydrophilic polymer or the like in order to improve the durability and fouling resistance (contamination resistance) of the composite semipermeable membranes are known. For example, Patent Document 1 describes a composite semipermeable membrane in which the separation functional layer is treated with a negatively charged hydrophilic polymer containing a functional group having a positive charge and a functional group having a negative charge.

PRIOR ART DOCUMENTS

Patent Documents

Patent Document 1: International Publication No. 2018/124103

SUMMARY OF INVENTION

Problem to be Solved by the Invention

However, the composite semipermeable membrane described in Patent Document 1 is configured by considering the improvement of fouling resistance in the presence of negatively charged foulant. Therefore, the fouling resistance of the composite semipermeable membrane described in Patent Document 1 may not be sufficient depending on the processing conditions. Therefore, stable desalination may not be possible over a long period of time.

An embodiment of the present invention is to provide a composite semipermeable membrane having excellent fouling resistance and capable of performing a stable desalting treatment over a long period of time.

Means for Solving Problems

A composite semipermeable membrane of an embodiment of the present invention includes a porous support membrane, a separation functional layer containing a polyamide disposed on the porous support membrane, and a coating layer disposed on the separation functional layer, wherein a water contact angle of a surface of the coating layer is 40° or less, and wherein a protein adsorption force of the surface of the coating layer is 0.4 nN or less.

Effects of the Invention

An embodiment of the present invention is to provide a composite semipermeable membrane having excellent fouling resistance and capable of performing a stable desalting treatment over a long period of time.

BRIEF DESCRIPTION OF DRAWINGS

FIG. 1 is a schematic cross-sectional view of a composite semipermeable membrane according to an embodiment of the present invention.

MODE FOR CARRYING OUT THE INVENTION

While the embodiments of the present invention will now be described in more detail, the present invention is not limited to the embodiments described herein. The content or ratio used herein is based on weight if the unit is not specified.

A composite semipermeable membrane 10 according to one embodiment of the present invention includes a porous support membrane 5 and a separation functional layer (also referred to as an active layer or a skin layer) 2 disposed on the porous support membrane 5, as illustrated in FIG. 1. The separation functional layer 2 in the present embodiment may be a separation functional layer containing primarily polyamide. More specifically, the separation functional layer 2 is a layer containing a crosslinked polyamide, preferably a layer consisting of a crosslinked polyamide.

In the composite semipermeable membrane 10 according to the present embodiment, a coating layer 1 is disposed on top of the separation functional layer 2. The coating layer 1 constitutes the top layer of the composite semipermeable membrane and is a layer in direct contact with the treated water when the composite semipermeable membrane is used. The coating layer 1 is preferably a layer that at least partially covers the separation functional layer 2 and covers the entire surface of the separation functional layer 2. The porous support membrane 5 may have a substrate 4 and a porous support layer 3 disposed on the substrate 4, and the separation functional layer 2 is formed on the porous support layer 3.

A water contact angle of a surface of the coating layer in the present embodiment may be 40° or less. The water contact angle may be preferably 35° or less, more preferably 30° or less, and even more preferably 25° or less. In the present embodiment, the coating layer has a high hydrophilicity corresponding to the water contact angle in the above range. The surface of the coating layer has a high hydrophilicity. Therefore, water molecules tend to preferentially adhere or bond to the surface of the coating layer, and a layer of hydrating water tends to form on the coating layer. Therefore, foulant is less likely to adhere to the surface of the coating layer.

A protein adsorption force on the surface of the coating layer is 0.4 nN or less, and preferably 0.38 nN or less. The coating layer has a protein adsorption force in the range described above, and in particular, the protein or protein-like foulant contained in the treated water is less likely to adhere. According to the present embodiment, the membrane performance of the composite semipermeable membrane can be maintained for a long period of time.

The coating layer in the present embodiment preferably contains a hydrophilic polymer. The percentage of the hydrophilic polymer constituting the coating layer may preferably be 80% by weight or more, more preferably 90% by weight or more, relative to the entire coating layer, and further preferably the coating layer consists of a hydrophilic polymer. The polymer used in the coating layer according to the present embodiment is hydrophilic. The polymer is preferably water-insoluble or not easily water-soluble.

Furthermore, the hydrophilic polymer is preferably amphoteric ion. Amphoteric ion polymers are polymers having both cationic and anionic groups within the molecule. A cationic group is a group that has a cation (a group with a positive charge) or a group that can have cations that change depending on the surrounding environment. Examples of cationic groups include amino groups, ammonium groups, sulfonium groups, phosphonium groups, and the like. Also, an anionic group is a group that has an anion (a group with a negative charge) or a group that can have anions that change depending on the surrounding environment. Examples of anionic groups include carboxyl groups, phosphonic acid groups, sulfate groups, phosphate groups, and the like.

The ratio of the amphoteric ion hydrophilic polymer to the entire coating layer is preferably 50% by weight or more, more preferably 60% by weight or more, more preferably 80% by weight or more, and even more preferably 90% by weight or more, and the coating layer may consist of an amphoteric ion hydrophilic polymer.

In the present embodiment, the coating layer includes an amphoteric ion polymer, thereby increasing the surface free energy of the coating layer and increasing the hydrophilicity of the coating layer. As a result, foulant is less likely to adhere to the surface of the coating layer.

The amphoteric ion hydrophilic polymer used in the coating layer is copolymerized with a first monomer represented by the following formula (1) and a second monomer represented by the following formula (2):

[Chem. 1]

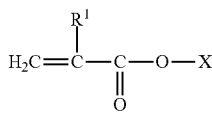

(1)

[Chem. 2]

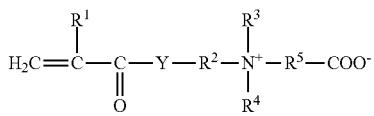

(2)

In the formulas (1) and (2), $R^1$ represents a hydrogen atom or a methyl group; $R^2$ represents an alkylene group having 1 to 6 carbons; $R^3$ and $R^4$ each independently represent an alkyl group having 1 to 4 carbons; $R^5$ represents an alkylene group having 1 to 4 carbons; X represents an alkoxysilyl group-containing group, a 3 to 4-membered ring ether-containing group, or an imide group-containing group; and Y represents an oxygen atom or a —NH— group.

The coating layer can be better bonded to the polyamide separation functional layer by having the amphoteric ion polymer including the portion derived from the first monomer. As a result, peeling of the coating layer is less likely to occur and the service life of the composite semipermeable membrane can be prolonged. In addition, the portion derived from the first monomer in the amphoteric ion polymer can be bonded to a functional group on the surface of the polyamide separation functional layer. Therefore, a condensation agent or the like is not required when the coating layer is formed on the polyamide separation functional layer, thereby reducing the cost and labor of manufacturing the composite semipermeable membrane.

When X in the first monomer is an alkoxysilyl group, the X may be the following functional group:

[Chem. 3]

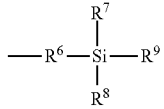

(3)

In the formula (3), $R^6$ represents an alkylene group of 1 to 6 carbon atoms, and $R^7$ to $R^9$ each independently represents an alkyl group of 1 to 4 carbon atoms or an alkoxy group of 1 to 4 carbon atoms, wherein at least one of $R^7$ to $R^9$ is an alkoxy group.

In the formula (3), one or more of $R^7$ to $R^9$ is an alkoxy group. From the viewpoint that the coating layer can form a stronger bond with the polyamide separation functional layer, preferably two or more of $R^7$ to $R^9$ are alkoxy groups, and more preferably $R^7$ to $R^9$ are all alkoxy groups.

Examples of the X of the first monomer include more specifically, a trimethoxysilyl propyl group, triethoxysilyl propyl group, methyldimethoxysilyl propyl group, methyldiethoxysilyl propyl group, or the like. Among these, the X is preferably a trimethoxysilyl propyl group or a methyl diethoxylyl propyl group. That is, examples of the first monomer preferably include γ-(meth)acryloyloxypropyltrimethoxysilane, γ-(meth)acryloyloxypropyltriethoxysilane, γ-(meth)acryloyloxypropyltriisopropoxysilane, γ-(meth) acryloyloxypropylmethyldimethoxysilane, γ-(meth)acryloyloxypropylmethyldiethoxysilane, γ-(meth)acryloyloxypropylmethyldipropoxysilane, and the like.

Also, if the X of the first monomer is a 3 to 4 membered cyclic ether-containing group, the X may be an epoxy group-containing group or an oxetanyl group-containing group. Of these, the oxetanyl group is preferably used, and the oxetanyl group substituted with an alkyl group having 1 to 3 carbon atoms or unsubstituted with an alkyl group having 1 to 3 carbon atoms is more preferably used. In particular, the X is preferably a (3-ethyloxetane-3-yl)methyl group. That is, a preferred example of the first monomer is a (3-ethyloxetane-3-yl)methyl(meth)acrylate.

Also, if the X of the first monomer is an imide group-containing group, the X is preferably a substituted or unsubstituted N-succinimidyl group. Of these, the X is more preferably an N-succinimidyl group. That is, a preferred example of the first monomer includes N-succinimidyl methacrylate.

The first monomer described above may be used alone or in a combination of two or more first monomers. As used herein, (meth)acrylate refers to methacrylate and/or acrylate.

In addition, the second monomer represented by the above formula (2) preferably includes a betaine structure. Examples of the second monomer include N-(meth)acryloyloxyethyl-N,N-dimethylammonium-α-N-methylcarboxybetaine, N-(meth)acryloylaminoethyl-N,N-dimethylammonium-α-N-methylcarboxybetaine, and the like.

The second monomer may also be used alone or in a combination of two or more second monomers.

As is apparent from the above description, the amphoteric nature of the amphoteric ion hydrophilic polymer in the present embodiment is derived from the second monomer. The first monomer preferably does not include a cationic group and an anionic group.

The weight ratio of the first monomer to the second monomer used to prepare the amphoteric ion polymers is preferably 3:97 to 95:5 and more preferably 5:95 to 75:25. If the weight ratio of the first monomer to the second monomer is 3:97 or greater, the coating layer containing the amphoteric ion hydrophilic polymer can be tightly bonded by the separation functional layer. On the other hand, if the weight ratio of the first monomer to the second monomer is 95:5 or less, amphoteric ion portions can be sufficiently present in the polymer, thereby improving the effect of preventing foulant attachment.

The amphoteric ion hydrophilic polymer in the present embodiment may be a copolymer of the first monomer and the second monomer, or may be a copolymer obtained by copolymerizing the first monomer, the second monomer, and a polymerizable monomer other than the first monomer and the second monomer (sometimes referred to as other polymerizable monomers). Examples of polymerizable monomers other than the first monomer and the second monomer include monomers having carbon-carbon unsaturated double bonds such as styrene-based monomers, carboxylate-based monomers, amide-based monomers, and the like. The other polymerizable monomers can be used alone or in a combination of two or more polymerizable monomers.

When other polymerizable monomers are used in the production of amphoteric ion hydrophilic polymers, the weight of the other polymerizable monomers to 100 parts by weight of all monomer may be 30 parts by weight or less, 10 parts by weight or less, or 5 parts by weight or less.

The ratio of the number of cationic groups to the number of anionic groups in the amphoteric ion hydrophilic polymer can be 40:60 to 60:40, preferably 55:45 to 45:55, even though the amphoteric ion hydrophilic polymer contains a moiety derived from other polymerizable monomers. When the ratio of the number of cationic groups to the number of anionic groups in the amphoteric ion hydrophilic polymer becomes close to 1:1, the number of cationic groups and the number of anionic groups in the amphoteric ion hydrophilic polymer can be balanced, thereby providing excellent fouling resistance to treated water over a wide range of pH. Therefore, even if the pH of the treated water and the type of electrolyte contained therein change over time, stable desalination treatment can be performed over a long period of time.

Polymerization initiators can be used to polymerize the first monomer, the second monomer, and optionally other monomers to obtain an amphoteric ion hydrophilic polymer. Examples of the polymerization initiators include azobisisobutyronitrile, azoisobutyronitrile, methyl azoisobutyrate, azobisdimethylvaleronitrile, benzoyl peroxide, potassium persulfate, ammonium persulfate, benzophenone derivatives, phosphine oxide derivatives, benzoketone derivatives, phenylthioether derivatives, azide derivatives, diazo derivatives, disulfide derivatives, and the like.

The weight average molecular weight of the amphoteric ion hydrophilic polymers used in the present embodiment is preferably 50,000 to 500,000, and more preferably 100,000 to 200,000. Having a weight average molecular weight in the above range allows for the coating layer of sufficient thickness to improve fouling resistance and for better handling of the polymer during a coating layer formation.

The coating layer may contain components other than amphoteric ion hydrophilic polymers. The components other than amphoteric ion hydrophilic polymers may be non-volatile hydrophilic components, including, for example, water soluble polymers such as polyvinyl alcohol, polyvinyl pyrrolidone, polyacrylic acid, and the like. Among them, a water-soluble polymer, particularly polyvinyl alcohol, is preferable from the viewpoint that the hydrated water layer is easily formed on the coating layer and the foulant is less likely adhered.

The above-described amphoteric ion hydrophilic polymers can react with the non-volatile hydrophilic components. Therefore, the inclusion of the non-volatile hydrophilic components can form a strong coating layer. As a result, the chemical resistance of the resulting coating layer to acid and alkali is improved. In particular, when polyvinyl alcohol is used as a component other than the amphoteric ion hydrophilic polymer, a composite semipermeable membrane with fouling resistance and chemical resistance can be produced at low cost.

When the coating layer contains a non-volatile hydrophilic component, the amount of the non-volatile hydrophilic component may be preferably in the range of 10% by weight to 50% by weight, more preferably in the range of 20% by weight to 40% by weight, and even more preferably in the range of 25% by weight to 35% by weight relative to the total amount of the coating layer (the layer as dried). If the amount of the non-volatile hydrophilic component is 10% by weight or more, chemical resistance to acids and alkalis can be improved. In addition, a composite semipermeable membrane can be manufactured at low cost while maintaining appropriate foulant resistance and desalting treatment performance. From the viewpoint of further improvement of foulant resistance, the amount of the non-volatile hydrophilic component is preferably 50% by weight or less.

When the coating layer contains a non-volatile hydrophilic component, the ratio of the content of non-volatile hydrophilic components other than amphoteric ion hydrophilic polymer in the coating layer to the content of the amphoteric ion hydrophilic polymer ((content of the non-volatile hydrophilic component)/(content of the amphoteric ion hydrophilic polymer)) is preferably 0.05 to 1, and more preferably 0.1 to 0.8.

Hereinafter, a method of manufacturing the composite semipermeable membrane will be described. The method of manufacturing the composite semipermeable membrane can include forming the porous support membrane, forming the separation functional layer, and forming the coating layer.

First, a substrate is prepared, and the porous support layer is formed on the substrate to form the porous support membrane. The substrate may be a fibrous planar structure, in particular, a woven fabric, a knitted fabric, a non-woven fabric, or the like. Of these, a non-woven fabric is preferably used. The type of fibers constituting the non-woven fabric is not limited, but is preferably a synthetic fiber. Specific examples of fibers include polyethylene terephthalate (PET), polybutylene terephthalate (PBT), polytrimethylene terephthalate (PTT), polyethylene naphthalate (PEN), polyglycolic acid (PGA), polylactic acid (PLA), nylon 6, polycaprolactone (PCL), polyethylene adipate (PEA), polyhydroxyalkanoate (PHA), or copolymers thereof. Of these, polyester, such as polyethylene terephthalate, is preferably used because of its high dimensional stability and moldability, as well as its high oil resistance.

Further, as the material of the porous support layer, a polysulfone, a polyethersulfone, a polycarbonate, a polyethylene oxide, a polyimide, a polyetherimide, a polyetherether ketone, a polypropylene, a polymethylpentene, a polymethylchloride, a polyvinylidene fluoride, or the like can be used. The method of forming the porous support layer on the substrate is not particularly limited, but is formed by, for example, applying a solution obtained by dissolving the above-described material in a solvent to the substrate, generating micro-phase separation at a predetermined temperature and humidity, and then solidifying the polymer.

The method of forming the polyamide separation functional layer on the porous support membrane is not particularly limited, but can be performed, for example, by immersing the surface of the porous support layer in a solution of a polyfunctional amine compound, followed by contacting the surface with a solvent solution of an acid halide compound to proceed with interfacial polymerization.

The polyfunctional amine may be an aromatic polyfunctional amine, an aliphatic polyfunctional amine, or a combination thereof. The aromatic polyfunctional amine may be m-phenylenediamine, p-phenylenediamine, 1,3,5-triaminobenzene, or the like, or N-alkylates thereof, such as N,N-dimethyl m-phenylenediamine, N,N-diethyl m-phenylenediamine, N,N-dimethyl p-phenylenediamine, N,N-diethyl p-phenylenediamine. Alternatively, the aliphatic polyfunctional amine may be piperazine or a derivative thereof. Specific examples of aliphatic polyfunctional amines include piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, ethylenediamine, and the like. These polyfunctional amines can be used alone or in a combination of two or more polyfunctional amines.

The acid halide compound is preferably an acid halide having two or more halogenated carbonyl groups per molecule, although the acid halide is not particularly limited if the acid halide compound provides a polyamide by reaction with the polyfunctional amine described above. As the acid halide compound, an acid halide compound of a fatty acid such as oxalic acid, malonic acid, maleic acid, fumaric acid, glutaric acid, 1,3,5-cyclohexanetricarboxylic acid, 1,3-cyclohexanedicarboxylic acid, or 1,4-cyclohexanedicarboxylic acid; an aromatic acid such as phthalic acid, isophthalic acid, 1,3,5-benzenetricarboxylic acid, 1,2,4-benzenetricarboxylic acid, 1,3-benzenedicarboxylic acid, 1,4-benzenedicarboxylic acid; and the like may be used. These acid halide compounds can be used alone or in combination of two or more acid halide compounds.

To form the coating layer on the separation functional layer, a solution containing the above-described amphoteric ion hydrophilic polymer, for example, an aqueous solution, is prepared in advance. Then, the surface of the separation functional layer is immersed in the polymer aqueous solution, followed by drying the surface to form the coating layer. Heat may be applied during drying.

The polymer solution used to form the coating layer (the coating solution), for example, the polymer concentration of the polymer aqueous solution, may preferably be in the range of 0.01% by weight to 5% by weight, and more preferably in the range of 0.05% by weight to 3% by weight. The concentration of the amphoteric ion hydrophilic polymer in the coating solution may also be preferably in the range of 0.01% by weight to 5% by weight, and more preferably in the range of 0.05% by weight to 3% by weight.

The time for immersing the surface of the separation functional layer in the polymer solution may be, for example, 1 second to 10 minutes, and preferably 5 seconds to 5 minutes.

For example, the non-volatile hydrophilic components described above can be added to the polymer solution (coating solution) used to form the coating layer. When the non-volatile hydrophilic component is added to the polymer solution, the concentration of the non-volatile hydrophilic component in the coating solution is preferably in the range of 0.025% by weight to 1% by weight, and more preferably in the range of 0.05% by weight to 0.5% by weight.

In addition, the composite semipermeable membrane is preferably formed as a flat membrane. In addition, the composite semipermeable membrane in the form of the flat membrane according to the present embodiment can be preferably used in a spiral-shaped membrane module in which the composite semipermeable membrane is wound around the outside of the water collection tube in a spiral-shaped manner.

Thus, the composite semipermeable membrane according to the present embodiment includes the coating layer covering the separation functional layer, and the surface of the coating layer has a predetermined water contact angle and a predetermined protein adsorption force. Therefore, the composite semipermeable membrane can be used continuously for a long period of time because the composite semipermeable membrane can favorably prevent the foulant, particularly the proteinaceous foulant, contained in the water to be treated from adhering.

The composite semipermeable membranes according to the present embodiment can be widely used for the production of pure water, desalination of seawater, and desalination treatment for reuse of industrial, agricultural, or domestic wastewater because the composite semipermeable membrane can prevent the adhesion of foulants well. In particular, industrial wastewater treatment often requires treatment of treated water with high salt and COD concentrations. However, according to the composite semipermeable membrane according to the present embodiment, such treated water can be treated with a high permeation volume for a long period of time. Accordingly, in a drain-free (ZLD) system or the like, stable operation for a long period of time can also be performed, and the maintenance work and cost for removal of the foulant of the separation functional membrane is also reduced.

EXAMPLES

Embodiments of the present invention will be described in accordance with the following examples, but the present invention is not limited by these examples.

<Examples of Manufacturing Composite Semipermeable Membranes>

An aqueous amine solution containing 3.0% by weight of m-phenylenediamine (MPD, 0.15% by weight of sodium dodecylsulfate, 2.15% by weight of triethylamine, 0.31% by weight of sodium hydroxide, 6% by weight of camphorsulfonic acid, and 1% by weight of isopropylalcohol was applied onto a polysulfone porous support layer formed on a polyester non-woven fabric, and then an excess aqueous amine solution was removed to form an aqueous solution coating layer. The surface of the aqueous solution coating layer was then immersed for 7 seconds in an acid chloride solution in which 0.075% by weight of trimesinate chloride (TMC) and 0.113% by weight of isophthalate chloride (IPC) were dissolved in a naphthenic solvent (Exxsol D40, manufactured by ExxMobil). The excess solution on the surface of the aqueous solution coating layer was then removed, air dried for 20 seconds, and held in a hot air dryer at 140° C. for 3 minutes to form the separation functional layer containing a polyamide resin on the porous polysulfone support layer. Then, the composite semipermeable membrane, in which the non-woven substrate, the polysulfone porous support layer, and the polyamide separation functional layer were arranged in this order, was formed.

Example 1

25.0 g of N-methacryloyloxyethyl-N,N-dimethylammonium-α-N-methylcarboxybetaine monohydrate, 4.4 g of γ-methacryloyloxypropyltrimethoxysilane, and 500.3 g of ethanol were charged into a 1 L volume vessel and stirred using a stirrer. After degassing by reducing the pressure in the vessel, nitrogen gas was introduced into the vessel and returned to the atmospheric pressure. Then, 2.8 g of azobis isobutyronitrile was added, the contents were aged for 8 hours while keeping the contents at 70° C., and then cooled to 30° C. in a water bath to prepare a polymer solution (a solution of amphoteric ion hydrophilic polymers).

In addition, water and isopropyl alcohol (IPA) were added to the resulting polymer solution to obtain a coating solution prepared so that the concentration of IPA was to be 10% by weight and the concentration of the amphoteric ion hydrophilic polymer was to be 0.2% by weight. The coating solution was immersed for 10 seconds on the surface of the separation functional layer of the composite semipermeable membrane produced in the examples of manufacturing the composite semipermeable membrane above. The separation functional layer was then air dried for 30 seconds and held at 120° C. for 2 minutes in a hot air dryer to form the coating layer.

Example 2

γ-methacryloyloxypropyltrimethoxysilane was changed to 4.6 g of γ-methacryloyloxypropylmethyldiethoxysilane, and a polymer solution was obtained in the same manner as in Example 1.

A coating solution was obtained from the resulting polymer solution in the same manner as Example 1, and a coating layer was formed on the separation functional layer of the composite semipermeable membrane manufactured in the above manufacturing example.

Example 3

γ-methacryloyloxypropyltrimethoxysilane was changed to 3.3 g of (3-ethyloxetane-3-yl)methylmethacrylate, and a polymer solution was obtained in the same manner as in Example 1.

A coating solution was obtained from the resulting polymer solution in the same manner as in Example 1, and a coating layer was formed on the separation functional layer of the composite semipermeable membrane manufactured in the above manufacturing example.

Example 4

The γ-methacryloyloxypropyltrimethoxysilane was changed to 3.2 g of N-methacryloxysuccinimide, and a polymer solution was obtained in the same manner as in Example 1.

A coating solution was obtained from the resulting polymer solution in the same manner as in Example 1, and a coating layer was formed on the separation functional layer of the composite semipermeable membrane manufactured in the above manufacturing example.

Example 5

A coating solution was prepared in the same manner as in Example 1 except that water, isopropyl alcohol (IPA), and polyvinyl alcohol (PVA) were added to the resulting polymer solution. The concentration of IPA in the coating solution in this example was 10% by weight, the concentration of amphoteric ion hydrophilic polymer was 0.2% by weight, and the concentration of polyvinyl alcohol was 0.1% by weight. The coating solution was used to form the coating layer on the separation functional layer of the composite semipermeable membrane manufactured in the manufacturing example above.

Comparative Example 1

The composite semipermeable membrane before forming the coating layer was used in Comparative Example 1.

The water contact angle and protein adsorption force of the surface of the coating layer were measured for the composite semipermeable membranes of Examples 1 to 4 described above and Comparative Example 1. In addition, membrane performance was evaluated. The results are indicated in Table 1.

<Measurement and Evaluation>
(Measurement of Contact Angle)

Static contact angle was automatically calculated by computer image analysis using the θ/2 method using Drop Master DM500 manufactured by Kyowa Interface Science Co., Ltd. The appropriate volume of the solution was 1.5 μL, and the contact angle was measured 10 seconds after the start of dropping of distilled water onto the separation functional layer.

(Measurement of Protein Adsorption Force)

The spring constant and sensitivity coefficient were determined using a cantilever modified with bovine serum albumin (BSA) on an Oxford Instruments MFP-3D-SA using the force curve method with the software provided with the instrument. The adsorption force was calculated by the following equation.

$$F=kx$$

F: Adsorption force, k: spring constant of cantilever,
x: sensitivity coefficient (=travel distance)

(Evaluation of Permeation Flux)

The resulting composite semipermeable membrane was permeable to RO water (reverse osmosis membrane filtered water) at a temperature of 25° C. for 30 minutes at a constant operating pressure of 1.5 MPa. The evaluation device used for the evaluation was an evaluation device equipped with a flat permeation cell, and the permeation was performed by a cross-flow method. The water permeation volume was measured and the permeation flux F1 ($m^3/m^2$/day) was calculated as the volume of permeated water (cubic meters) per day per square meter of membrane surface.

As an example of confirming the biofouling prevention effect of organic substances, after the measurement of the permeation flux, a casein aqueous solution at a concentration of 300 mg/L at a temperature of 25° C. was contacted with a composite semipermeable membrane for 30 minutes at a constant operating pressure of 1.5 MPa. Thereafter, RO water at a temperature of 25° C. was permeable for 30 minutes at a constant operating pressure of 1.5 MPa. The volume of permeated water obtained by this operation was measured, and the permeation flux F2 was calculated as described above.

From the permeation flux before contacting the casein solution (initial permeated flux) F1 and the permeation flux after contacting the casein solution F2, the value of F2/F1× 100 was calculated. This value can be called the rate of change of the permeation flux.

TABLE 1

| | Contact angle [degree] | Protein adsorption force [nN] | Permeation flux F1 [m³/m²/day] (Before contacting casein) | Permeation flux F2 [m³/m²/day] (After contacting casein) | F2/ F1 × 100 [%] |
|---|---|---|---|---|---|
| Example 1 | 25 | 0.35 | 0.67 | 0.66 | 98.5% |
| Example 2 | 25 | 0.36 | 0.65 | 0.64 | 98.5% |
| Example 3 | 25 | 0.37 | 0.66 | 0.65 | 98.5% |
| Example 4 | 25 | 0.36 | 0.68 | 0.66 | 97.1% |
| Example 5 | 27 | 0.36 | 0.65 | 0.64 | 98.5% |
| Comparative Example 1 | 50 | 0.63 | 0.81 | 0.70 | 86.4% |

DESCRIPTION OF THE REFERENCE NUMERALS

1 Coating layer
2 Separation functional layer
3 Porous support layer
4 Substrate
5 Porous support membrane
10 Composite semipermeable membrane

The invention claimed is:

1. A composite semipermeable membrane comprising:
a porous support membrane;
a separation functional layer containing a polyamide disposed on the porous support membrane; and
a coating layer disposed on the separation functional layer,
wherein a water contact angle of a surface of the coating layer is 40° or less, and
wherein a protein adsorption force of the surface of the coating layer is 0.4 nN or less wherein the coating layer contains an amphoteric ion hydrophilic polymer, wherein the amphoteric ion hydrophilic polymer is copolymerized with a first monomer represented by the following formular (1) and second monomer represented by the following formula (2):

[Chem. 1]

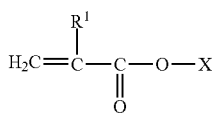

(1)

[Chem. 2]

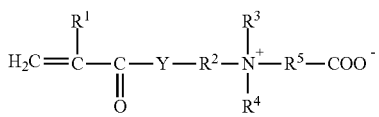

(2)

In the formulas (1) and (2), $R^1$ represents a hydrogen atom or a methyl group; $R^2$ represents an alkylene group having 1 to 6 carbons; $R^3$ and $R^4$ each independently represent an alkyl group having 1 to 4 carbons; $R^5$ represents an alkylene group having 1 to 4 carbons; X represent an alkoxysilyl group-containing group, or an imide group-containing group; and Y represents an oxygen atom or a —NH— group.

2. The composite semipermeable membrane according to claim 1, wherein the X in the formula (1) represents a trimethoxysilyl propyl group, a methyldimethoxysilyl propyl group, a methyldiethoxysilyl propyl group, a triethoxysilyl propyl group, a (3-ethyloxetane-3-yl)methyl group, or an N-succinimidyl group.

3. The composite semipermeable membrane according to claim 1, wherein, a weight ratio of the first monomer to the second monomer is 3:97 to 95:5.

4. A method of manufacturing a composite semipermeable membrane comprising:
forming a porous support membrane;
forming a separation functional layer containing a polyamide on the porous support membrane; and
forming a coating layer on the separation functional layer,
wherein a water contact angle of a surface of the coating layer is 40° or less, and
wherein a protein adsorption force of the surface of the coating layer is 0.4 nN or less wherein the coating layer contains an amphoteric ion hydrophilic polymer, wherein the amphoteric ion hydrophilic polymer is copolymerized with a first monomer represented by the following formular (1) and second monomer represented by the following formula (2):

[Chem. 1]

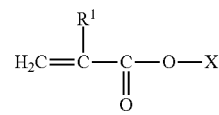

(1)

[Chem. 2]

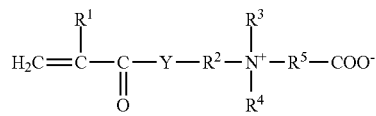

(2)

In the formulas (1) and (2), $R^1$ represents a hydrogen atom or a methyl group; $R^2$ represents an alkylene group having 1 to 6 carbons; $R^3$ and $R^4$ each independently represent an alkyl group having 1 to 4 carbons; $R^5$ represents an alkylene group having 1 to 4 carbons; X represent an alkoxysilyl group-containing group, or an imide group-containing group; and Y represents an oxygen atom or a —NH— group.

* * * * *